United States Patent [19]

Daniel

[11] Patent Number: 4,564,947
[45] Date of Patent: Jan. 14, 1986

[54] HIGH-POWER LASERS

[75] Inventor: Jacob Daniel, Holon, Israel

[73] Assignee: Metalworking Lasers International Ltd., Neve Sharett, Israel

[21] Appl. No.: 431,252

[22] Filed: Sep. 30, 1982

[51] Int. Cl.⁴ .............................................. H01S 3/22
[52] U.S. Cl. ..................................... 372/58; 372/93; 372/107; 372/29; 372/55; 372/700
[58] Field of Search ................... 372/107, 55, 31, 108, 372/58, 29, 700, 93, 94

[56] References Cited

U.S. PATENT DOCUMENTS 4,486,887 12/1984 Hoag et al. ......................... 372/107

*Primary Examiner*—William L. Sikes
*Assistant Examiner*—Léon Scott, Jr.
*Attorney, Agent, or Firm*—Benjamin J. Barish

[57] ABSTRACT

A high-power flowing-gas laser comprises an outer housing, an optical system including a laser channel within the housing, and an impeller for producing a flow of gas through the laser channel. The laser channel is folded so as to be constituted of a plurality of legs disposed in a polygon, preferably square, configuration, there being a gas flow channel for each laser channel leg and including an axially-extending inlet section and a radially-extending outlet section, the latter being formed with aligned laser openings for accommodating the laser beam of the respective laser channel leg. The laser further includes an internal partition wall between the outlet end of the impeller and the inlet ends of the gas flow channels for confining the gas flow from the impeller to the inlet ends of the gas flow channels, which partition substantially precludes gas flow into the gas flow channel legs through the aligned laser openings at the outlet sections of the gas flow channels.

10 Claims, 3 Drawing Figures

HIGH-POWER LASERS

RELATED APPLICATIONS

The present application is related to pending application Ser. No. 410,594 filed Aug. 23, 1982 by Ethan D. Hoag and Glen W. Zeiders, now U.S. Pat. No. 4,486,887 issued Dec. 4, 1984, Ser. No. 431,041 filed Sept. 30, 1982 by Ethan D. Hoag, and Ser. No. 431,254 filed Sept. 30, 1982 by Ethan D. Hoag, and Ser. No. 431,253 filed Sept. 30, 1982 by David Katz, all assigned to the same assignee as the present application.

BACKGROUND OF THE INVENTION

The present invention relates to lasers, and particularly to high-power flowing-gas lasers.

There has been considerable activity in recent years to produce high-power flowing-gas lasers for use particularly in the metalworking industries. Examples of some of the known lasers of this type are described in U.S. Pat. Nos. 3,641,457; 3,702,973; 3,886,481; 4,058,778; 4,317,090; and 4,321,558. One of the main problems in the design of such high-power lasers is the dissipation of the heat, since power lasers cannot operate efficiently at unduly high temperatures. For example, the $CO_2$ laser, which is the one mainly used today for high power applications, cannot operate efficiently at temperatures much above 200° C. While the heat dissipation, and therefore the power output, can both be increased by increasing the length of the laser channel, this entails a considerable increase in the size and cost of the laser.

One object of the present invention, therefore, is to provide a novel high-power flowing-gas laser which maximizes the power output capability of the laser for a given system size, and which also reduces optical disturbances and other disturbances affecting the stability of the electrical discharge producing the population inversion in the laser gas.

SUMMARY OF THE INVENTION

According to the present invention, there is provided a high-power flowing-gas laser comprising: an outer housing having a sealed wall capable of withstanding an internal pressure different from atmosphere; an optical system inclusing a folded laser channel constituted of a plurality of legs disposed in a polygon configuration; an impeller for producing a flow of gas through the folded laser channels; and a gas flow channel for each laser channel leg. Each of the gas flow channels includes an inlet end for receiving gas from the impeller, and an outlet end formed with a pair of aligned laser openings for accommodating the laser beam of the respective laser channel leg. The laser further includes a partition wall extending across the interior of the housing between the outlet end of the impeller and the inlet ends of the gas flow channels for substantially confining the gas flow from the impeller first through the inlet ends of the gas flow channels, and then through the outlet ends thereof, whereby there is no significant gas flow through the laser openings at the outlet ends of the gas flow channels.

In the described preferred embodiment each of the gas flow channels includes an axially-extending leg defining the inlet end of the channel, and a radially-extending leg defining the outlet end of the channel. The partition wall is formed with a circular array of openings one for accommodating the inlet end of each of the gas flow channels. Preferably, the folded laser channel includes four legs disposed in a square configuration, the partition wall being provided with four openings one for the inlet end of each of the gas flow channel legs.

BRIEF DESCRIPTION OF THE DRAWINGS

The invention is herein described, by way of example only, with reference to the accompanying drawings, wherein.

DESCRIPTION OF A PREFERRED EMBODIMENT

The embodiment of the invention described herein is that described in copending patent application Ser. No. 410,594 dated Aug. 23, 1982, now U.S. Pat. No. 4,486,887 by Ethan D. Hoag, and assigned to the same assignee as the present application.

Figure 1:
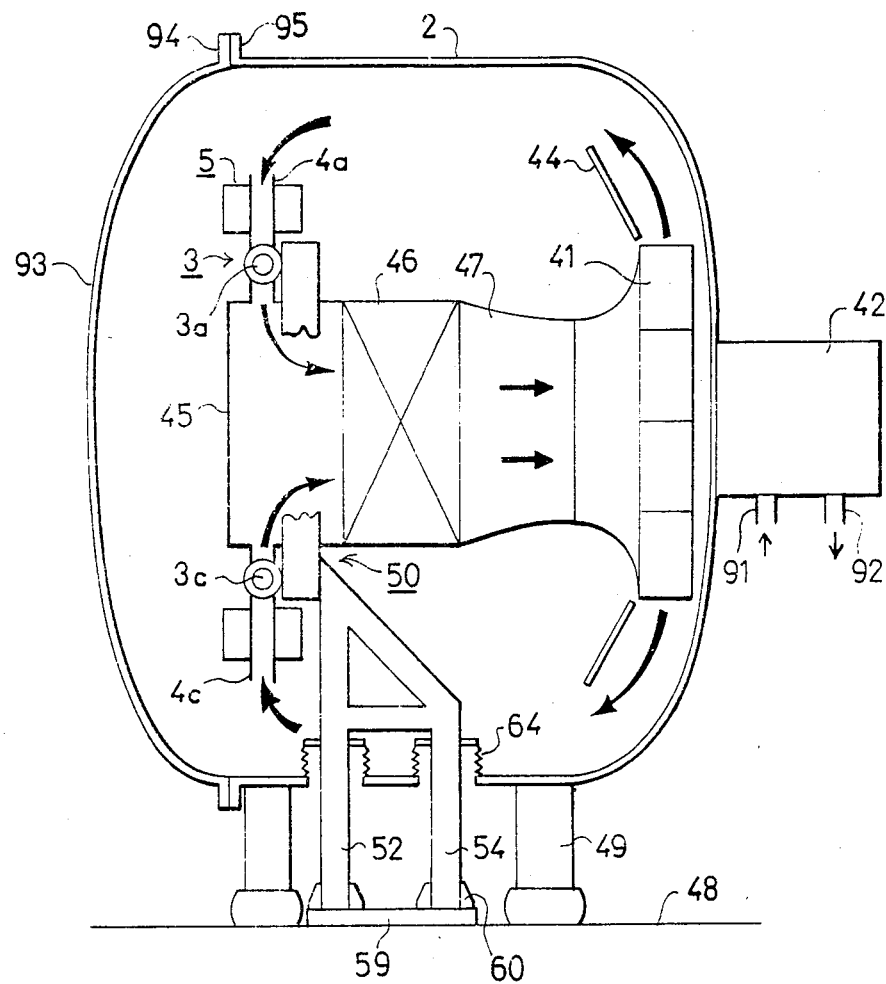
FIG. 1 is a side elevation view schematically illustrating one form of laser constructed in accordance with the present invention.

With reference first to FIG. 1, there is illustrated a high-power flowing-gas laser including an outer housing 2 capable of withstanding an internal pressure which is different from atmospheric. In this type of laser, the pressure is below about 0.2 atmospheres. The preferred pressure for the arrangement illustrated, particularly for the type of electric discharge to be used for exciting the laser gas, is about 0.05 atmospheres. The gas is preferably one of the known $CO_2$ mixtures commonly used in high-power lasers.

The laser channel in which lasing occurs is in the form of a folded optical cavity or resonator, generally designated 3, and more particularly describe in copending patent application Ser. No. 410,594, filed Aug. 23, 1982, now U.S. Pat. No. 4,486,887 . As shown particularly in FIG. 2 the optical cavity or resonator 3 is folded so as to be constituted of four legs 3a–3d arranged in a square configuration. These four legs are defined by a primary mirror 31 at one end, a feedback mirror 32 at the opposite end, and three folding mirrors 33, 34, and 35, each disposed between a pair of adjacent legs and oriented 45° to the beam, to thereby reflect the rays from one leg to the next. The output mirror 36 is a scraper mirror just in front of feedback mirror 32, and removes a portion of the laser rays reflected within the four-leg optical cavity and deflects same through an output window 37, such as a ZnSe window, to produce the output laser beam.

Figure 3:
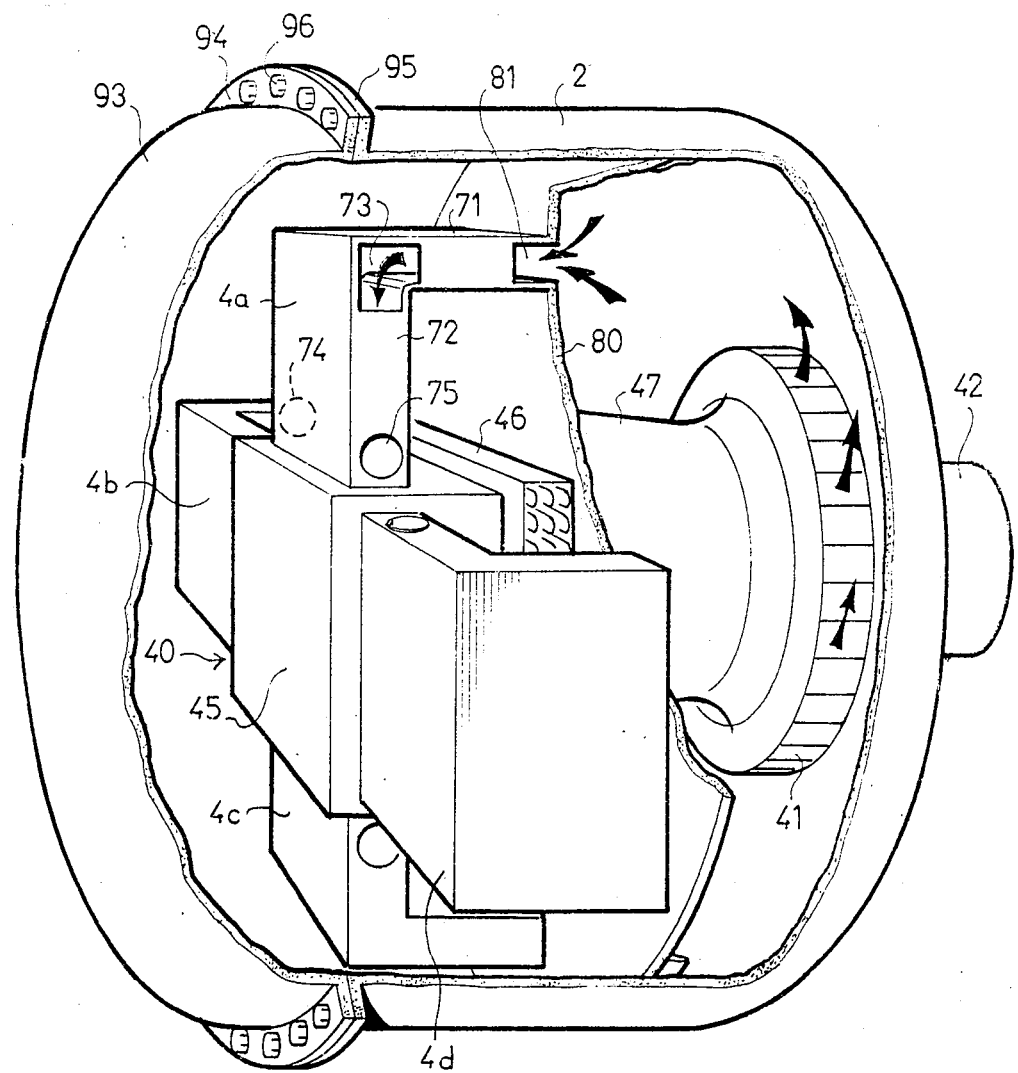
FIG. 3 is a three-dimensional view, partly broken away, particularly illustrating the gas flow path in the laser of FIGS. 1 and 2.

The illustrated laser includes a conduit system, generally designated 40 and best seen in FIG. 3, for producing a flow of the laser gas transversely across each of the legs 3a–3d of the folded laser channel. Each laser channel leg is served by a separate gas flow channel 4a–4d, respectively, through which a gas flow is produced by means of an impeller 41 driven by an electric motor 42 (e.g. FIG. 1), the output end of impeller 41 being equipped with a diffuser 44.

The gas flowing via the flow channels 4a–4d flows transversely through the respective legs 3a–3d of the folded laser channel, but first the gas is excited by an electrical discharge system, generally designated 5 in FIG. 1, provided at the upstream side of each laser channel leg. Various types of electrical discharge systems are known and could be used, e.g., one including an external ionization source, such as an electron beam. However, in the present case it is preferred to use a high frequency electrical discharge system including segmented electrodes and ballasting, such as shown in copending patent application Ser. No. 431,254, filed Sept. 30, 1982.

The gas flowing through the gas channels 4a–4d is subjected to an increase in temperature as the gas flows transversely across the respective legs 3a–3d of the laser optical cavity 3, so that the gas exiting from channels 4a–4d is at a substantially higher temperature than the gas entering them. The heated gas is directed by conduit means including a wall 45 (FIGS. 1 and 3) to flow through a heat exchanger 46, and then via a conduit 47 to the input of impeller 41 for recirculation through the gas flow channels 4a–4d.

As briefly described above, and more particularly in copending patent application No. 410,594 filed Aug. 23, 1982, now U.S. Pat. No. 4,486,887, folding the laser optical cavity 3 so as to be constituted of four legs 3a–3d arranged in a square configuration in a common plane, with a folding mirror 33, 34, 35 between each pair of legs, provides a number of important advantages. Thus, the folding mirrors are disposed so that the laser rays are alternately transposed from the upstream (or downstream) side of one leg to the downstream (or upstream) side of the next adjacent leg, with respect to the gas flowing transversely across the legs. Such an arrangement provides compensation for phase distortion due to the density gradient, and also compensation for amplitude variations due to the gain gradient in the gas flowing transversely across the legs, which is apparent by tracing the path of the extreme rays $R_1$ and $R_2$ (FIG. 2) through all four of the laser channel legs 3a–3d, starting from the primary mirror 31 to the feedback mirror 32. Thus, ray $R_1$ is on the upstream side of the gas flow channel 4a for laser leg 3a, and ray $R_2$ is on the downstream side in laser channel leg 3a; but both are transposed by the first folding mirror 33 between laser channel legs 3a and 3b so that in leg 3b ray $R_1$ appears on the downstream side of the flow channel, and ray $R_2$ appears on the upstream side. A similar transposition is produced by folding mirror 34, which returns ray $R_1$ to the upstream side and ray $R_2$ to the downstream side in leg 3c; and another transposition is effected by folding mirror 35 which again reflects ray $R_1$ to the downstream side and ray $R_2$ to the upstream side in leg 3d.

Thus, any phase distortion due to the density gradient (inverse to the termperature gradient) in one leg will be compensated for in the next adjacent leg; and similarly any amplitude variations due to the gain gradient in one leg will also be compensated for by the transposition in the next adjacent leg. Maximum compensation is produced by providing an even number of legs in the laser channel so that the variations in one leg cancel those in the next, and by providing a separate flowing gas channel for each of the laser channel legs so that the gas flow is in parallel, rather than in series, across the respective legs. A further description of this aspect of the illustrated laser system is set forth in the above-cited copending application Ser. No. 410,594 filed Aug. 23, 1982, now U.S. Pat. No. 4,486,887.

According to an important feature of the illustrated system, the mirrors comprising the optical system 3 are supported on an independent mounting, generally designated 50 in FIG. 1, which is separate and apart from the housing mounting, generally designated 49 in FIG. 1, such as to isolate the optical system from the vibrational disturbances produced by the impeller 41 and the motor drive 42. Briefly, this independent mounting 50 includes a temperature-stabilized mild steel frame support on four legs (e.g. 52, 54) each of which protrudes out of the vacuum chamber in housing 2 through a flexible lead-through, such as an elastomeric boot or a metal bellows 64, to a heavy base 59 beneath the chamber. The chamber, including the impeller and its drive, is isolated from the factory floor 48 (FIG. 1) by vibrational isolator mounts. This arrangement isolates the optical components from the major vibration source, (namely, the impeller and its drive), while allowing the laser beam source, (i.e., the optical resonator) to be positively referenced to the factory floor. Further details of this feature are described in copending application No. 431,014 filed Sept. 30, 1982.

In the illustrated laser, the gas conduit system 40 confines substantially all the gas to flow through a path transversely across each of the channel legs 3a–3d. As described in copending patent application No. 410,594, filed Aug. 23, 1982, now U.S. Pat. No. 4,486,887, such an arrangement reduces optical disturbances; but in addition, and as described below, it also reduces other disturbances affecting the stability of the electric discharge producing the population inversion in the laser gas, besides providing other important advantages.

Figure 2:
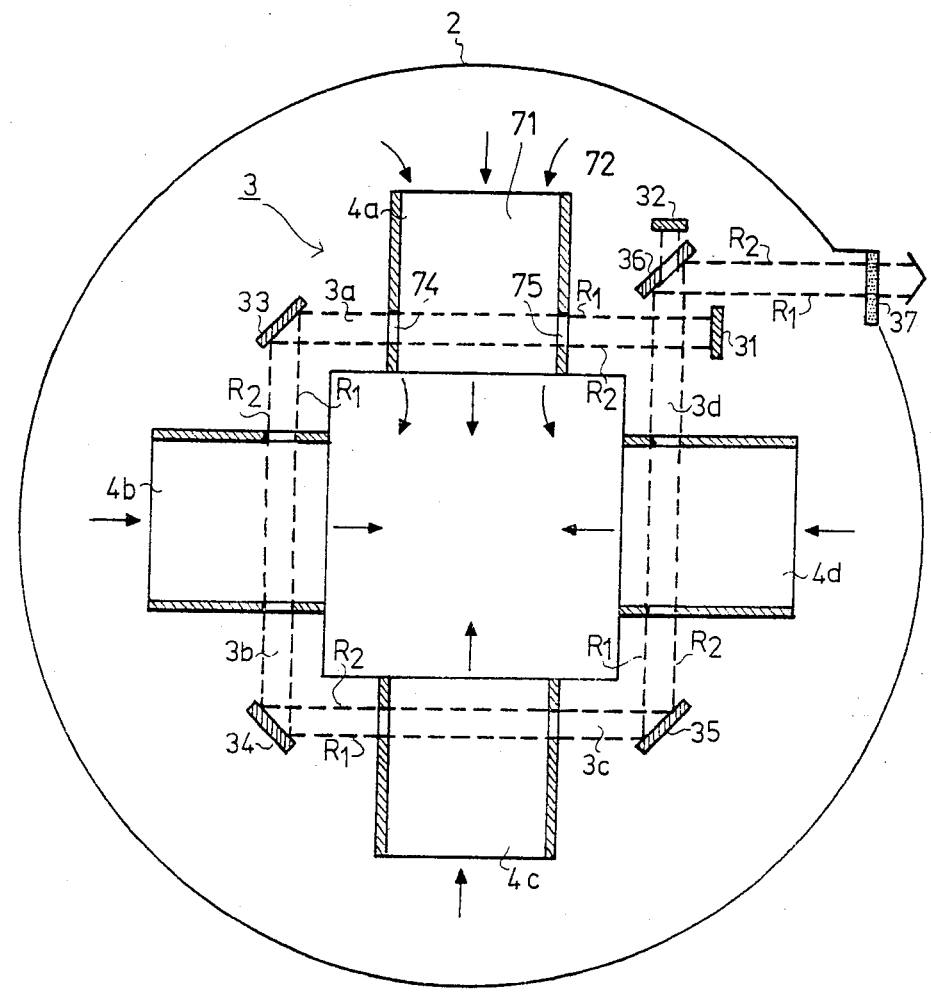
FIG. 2 is a view, transverse to that of FIG. 1, schematically showing the folded laser channel of the optical system and the flowing gas channels for conducting the gas flow transversely through the laser channel legs.

Thus, as shown particularly in FIGS. 2 and 3, each of the gas channel legs 4a–4d includes (for leg 4a) an axially-extending inlet section 71, a radially-extending section 72, and baffles 73 fixed at the juncture of the two sections to direct the gas flow from the axial section to the radial section. The electrical discharge system (generally designated 5 in FIG. 1 as noted above) is disposed at the upper end of the respective radially-extending section 72 of each channel. The lower end of each of the radially-extending sections is provided with the pair of openings, 74, 75, aligned with each other and with the respective mirrors of the folded optical system, e.g. mirrors 31 and 33 for laser leg 3a.

As shown particularly in FIG. 3, the laser further includes an internal partition wall or bulkhead 80 between the impeller 41 and the heat-exchanger 46. Impeller 80 is secured at its outer end to the inner face of housing 2. It is provided with four outer openings 81, one for accommodating the inlet end of the axially-extending section (e.g. 71) of each of the four gas channels 4a–4d. It is also provided with a central opening for accommodating the conduit 47 between the heat-exchanger 46 and the impeller 41.

It will thus be seen that the internal partition wall 80 confines the gas flow from the impeller 41 and its diffuser 44 to the inlet sections (e.g. 71) of the four gas flow channels 4a–4d, whereupon the gas is conducted by the axially-extending sections and then by the radially-extending sections (e.g. 72), to flow transversely across the laser channel legs 3a–3d at the lower ends of the gas flow channels. As indicated earlier, the laser gas is excited by the electrical discharge system (5 in FIG. 1) at the upper end of each of the radially-extending sections, and gives up this energy to the laser beam or mode passing through the aligned openings (e.g. 74, 75) at the lower ends. As also indicated earlier, the gas is heated during its traverse of the respective channel section, so that the gas exiting from the gas flow channels 4a–4d is at a higher temperature than that entering them. This heated gas leaves the gas flow channels 4a–4d in the central common collection region and is then directed by wall 45 to the heat-exchanger 46, and then via conduit 47 passing through the internal partition wall 80 to the impeller 42 for recirculation back through the gas flow channels 4a–4d.

The foregoing arrangement substantially confines all the gas to enter the four gas channels 4a–4d via their respective inlet sections (e.g. 71), with substantially no gas entering the gas channels via the laser openings (e.g. 74, 75 for leg 4a). This has been found to produce a number of advantages besides those described in the above-cited corresponding patent application Ser. No. 410,594 filed Aug. 23, 1982, now U.S. Pat. No. 4,486,887. Thus, in addition to significantly reducing the optical disturbances heretofore caused by gas flow through the openings accommodating the laser beam or mode, it has been found also to significantly reduce the instability in the electrical discharge produced by the gas flow through the openings in accommodating the laser beam or mode. In addition, since substantially all the gas thus circulated passes through the electrical field which produces the population inversion, the described arrangement significantly increases the overall efficiency of the laser, as compared to one wherein there is significant gas flow through the openings in the gas flow channel accommodating the laser beam or mode. Still further, the novel arrangement makes efficient use of the inward radial flow of the gas for maximizing the cooling for a given system volume.

In the system illustrated, the drive motor 42 is directly mounted to one end wall of the housing 2 and is provided with water-cooling means including an inlet tube 91 and an outlet tube 92. The opposite end wall 93 of the housing is removably attached by means of flanges 94 and 95 to provide ready access into the interior of the housing.

While the invention has been described with respect to one preferred embodiment, it will be appreciated that other variations and applications of the invention may be made.

What is claimed is:

1. A high-power flowing-gas laser comprising: an outer housing having a sealed wall capable of withstanding an internal pressure different from atmosphere; an optical system including a folded laser channel constituted of a plurality of legs disposed in a polygon configuration; an impeller for producing a flow of gas through said folded laser channels; a gas flow channel for each laser channel leg, each of said gas flow channels including an inlet end for receiving gas from the impeller, and an outlet end formed with a pair of aligned laser openings for accommodating the laser beam of the respective laser channel leg; and a partition wall extending across the interior of the housing between the outlet end of the impeller and the inlet ends of said gas flow channels for substantially conforming the gas flow from the impeller first through the inlet ends of the gas flow channels, and then through the outlet ends thereof, whereby there is no significant gas flow through the laser openings at the outlet ends of the gas flow channels.

2. The laser according to claim 1, wherein each of said gas flow channels includes an axially-extending leg defining the inlet end of the channel, and a radially-extending leg defining the outlet end of the channel, said partition wall being formed with a circular array of openings one for accommodating the inlet end of each of said gas flow channels.

3. The laser according to claim 2, wherein said folded laser channel includes four legs disposed in square configuration, said partition wall being provided with four openings one for the inlet end of each of said gas flow channel legs.

4. The laser according to claim 1, wherein said impeller produces a flow of gas through the gas flow channels in the radially-inward direction to a central collection region, and then through a conduit leading from said central collection region back to the impeller, said partition wall further including a central opening for accommodating said conduit.

5. The laser according to claim 4, further including a heat-exchanger within said conduit between the outlet ends of said gas flow channels and said partition wall.

6. The laser according to claim 5, further including a diffuser between the outlet end of said impeller and said internal partition wall.

7. A high-power flowing-gas laser comprising: a outer housing having a sealed wall capable of withstanding an internal pressure different from atmosphere; an optical system including a folded laser channel constituted of a plurality of legs disposed in a polygon configuration; an impeller for producing a flow of gas through said folded laser channel; a gas flow channel for each laser channel leg; each of said gas flow channels including an axially-extending leg defining the inlet section of the channel for receiving gas from the impeller and a radially-extending leg defining the outlet section of the channel; said outlet section including an electrical discharge system and a pair of aligned laser openings for accommodating the laser beam of the respective laser channel leg; and a partition wall extending across the interior of the housing between the outlet end of the impeller and the inlet sections of said gas flow channels; said partition wall being formed with a circular array of openings one for the inlet section of each of said gas flow channels for substantially confining the gas flow from the impeller first through the inlet sections of the gas flow channels, and then through the outlet sections thereof, whereby there is no significant gas flow through the laser openings at the outlet sections of the gas flow channels.

8. The laser according to claim 7, wherein said folded laser channel includes four legs disposed in a square configuration, said partition wall being provided with four openings one for the inlet section of each of said gas flow channel legs.

9. The laser according to claim 7, wherein said impeller produces a flow of gas through the gas flow channels in the radially-inward direction to a central collection region, and then through a conduit leading from said central collection region back to the impeller, said partition wall further including a central opening for accommodating said conduit.

10. The laser according to claim 9, further including a heat-exchanger within said conduit between the outlet sections of said gas flow channels and said partition wall.

* * * * *